United States Patent
Boehme et al.

(10) Patent No.: US 10,621,174 B2
(45) Date of Patent: *Apr. 14, 2020

(54) PARTITIONED JOINS IN ANALYTICAL DATABASES

(71) Applicant: International Business Machines Corporation, Armonk, NY (US)

(72) Inventors: Thomas Boehme, Stuttgart (DE); Andreas Brodt, Gerlingen (DE); Oliver Koeth, Stuttgart (DE); Oliver Schiller, Dettingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/137,589

(22) Filed: Sep. 21, 2018

(65) Prior Publication Data

US 2019/0026340 A1 Jan. 24, 2019

Related U.S. Application Data

(63) Continuation of application No. 15/452,778, filed on Mar. 8, 2017, now abandoned, which is a continuation of application No. 14/919,092, filed on Oct. 21, 2015, now abandoned.

(51) Int. Cl.
*G06F 17/30* (2006.01)
*G06F 16/2455* (2019.01)
*G06F 16/2453* (2019.01)

(52) U.S. Cl.
CPC .... *G06F 16/2456* (2019.01); *G06F 16/24537* (2019.01); *G06F 16/24544* (2019.01); *G06F 16/24554* (2019.01)

(58) Field of Classification Search
CPC .......... G06F 16/2456; G06F 16/24537; G06F 16/24544; G06F 16/24554
USPC ....................................................... 707/714
See application file for complete search history.

(56) References Cited

U.S. PATENT DOCUMENTS

| | | |
|---|---|---|
| 6,609,131 B1 | 8/2003 | Zait |
| 6,931,390 B1 | 8/2005 | Zait |
| 7,203,686 B1 | 4/2007 | Sinclair |
| 7,917,512 B2 | 3/2011 | Bhide |
| 8,244,715 B2 | 8/2012 | Cole |
| 8,935,257 B1 | 1/2015 | Vemuri |
| 9,292,571 B1 | 3/2016 | Kiryakov |
| 2005/0038784 A1 | 2/2005 | Zait |

(Continued)

OTHER PUBLICATIONS

Boehme et al., "Partitioned Joins in Analytical Databases", U.S. Appl. No. 14/919,092, filed Oct 21, 2015, pp. 1-32.

(Continued)

*Primary Examiner* — Alicia M Willoughby
(74) *Attorney, Agent, or Firm* — Alexander G. Jochym

(57) ABSTRACT

A first data table and a second table to be joined is determined. The first data table and the second data table have a join attribute. Data blocks of the first data table are stored on a storage device. An attribute value information for the join attribute for the data block of the first data table is determined. At least one partition for the first data table and the second table is defined using at least the attribute value information on the join attribute. Each partition of the at least one partition has a respective partition range of values of the join attribute. A pair wise partition join is processed on a first partition range of the determined partition ranges.

19 Claims, 6 Drawing Sheets

(56) References Cited

U.S. PATENT DOCUMENTS

| 2012/0124045 | A1 | 5/2012 | Pendap |
| 2014/0101130 | A1 | 4/2014 | Kang |
| 2014/0250142 | A1 | 9/2014 | Pradhan |
| 2015/0095307 | A1 | 4/2015 | Bensberg |
| 2016/0026667 | A1 | 1/2016 | Mukherjee |
| 2016/0350375 | A1 | 12/2016 | Das |
| 2016/0378824 | A1 | 12/2016 | Li |
| 2017/0031988 | A1 | 2/2017 | Sun |

OTHER PUBLICATIONS

Boehme et al., "Partitioned Joins in Analytical Databases", U.S. Appl. No. 15/452,778, filed Mar. 8, 2017, pp. 1-27.

Brodt, Andreas et al.; "Partitioned Joins in Analytical Databases"; IBM Germany Research and Development; Dec. 4, 2014; pp. 1-9.

Dewitt, David J. et al.; "Implementation Techniques for Main Memory Database Systems"; ACM 0-89791-128-8/84/006/0001; Copyright 1984; pp. 1-8.

IBM Appendix P., "IBM Patents or Patent Applications to Be Treated as Related", Dated Mar. 8, 2017, 2 pages.

Unknown; "13 Using Zone Maps"; Database Data Warehousing Guide; Oracle Help Center; Copyright 2015 Oracle and/or its affiliates; pp. 1-26; <http://docs.oracle.com/database.121/DWHSG/zone_mpas.html>.

Unknown; "5 () Partitioning in Data Warehouses"; Database Data Warehousing Guide; Oracle Help Center; Copyright 2015 Oracle and/or its affiliates; pp. 1-37; <https://docs.oracle.com/cd/B19306_01/server.102/b14223/parpart.html>.

Unknown; "Hash join"; Wikipedia the free encyclopedia; pp. 1-4; <http://en.wikipedia.org/wiki/Hash_join#Hybrid_hash_join.9>.

Unknown; "Oracle Partitioning with Oracle Database 12c—Efficient Data Management and Performance Acceleration for every System"; Oracle; Oracle White Paper; Sep. 2014; pp. 1-14.

PARTITIONED JOINS IN ANALYTICAL DATABASES

BACKGROUND

The present invention relates to the field of digital computer systems, and more specifically, to a method for performing a partitioned join on a first and a second data table.

SUMMARY

Embodiments of the present invention include a method, computer program product, and system for performing a partitioned join. In one embodiment, a first data table and a second table to be joined is determined. The first data table and the second data table have a join attribute. Data blocks of the first data table are stored on a storage device. An attribute value information for the join attribute for the data block of the first data table is determined. At least one partition for the first data table and the second table is defined using at least the attribute value information on the join attribute. Each partition of the at least one partition has a respective partition range of values of the join attribute. A pair wise partition join is processed on a first partition range of the determined partition ranges. A first data blocks of the first data table that fully fall under the first partition range are determined using the attribute value information. The determined first data blocks are read from the disk into a memory. The determined first data blocks are fed into the partition join on the first partition range with the second data table. A second data blocks of the first data table are determined that partially fall under the first partition range using the attribute value information. The records of the determined second data blocks that fall under the first partition range are selectively fed to the procession of the first partition range with the second data table.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
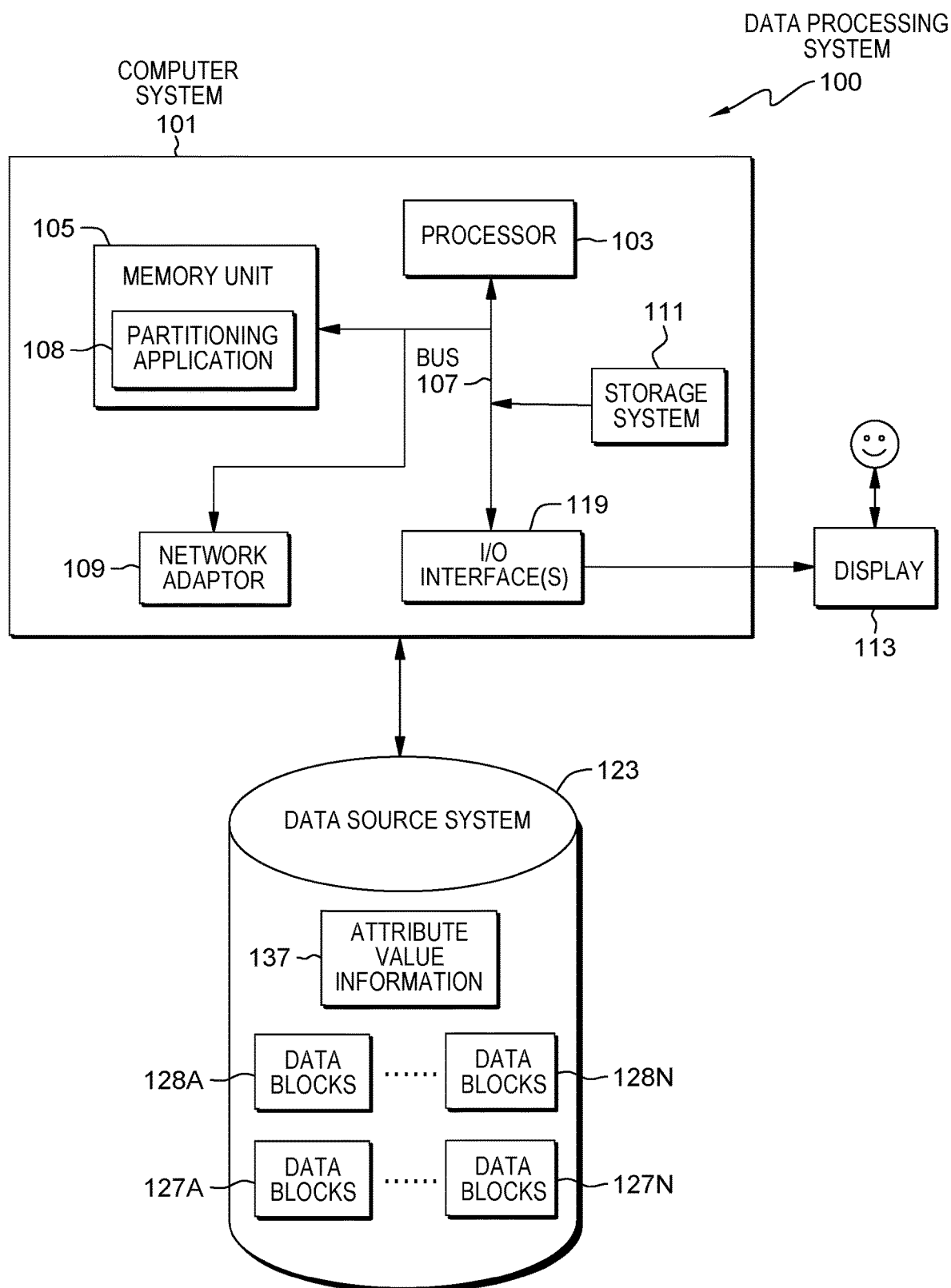
FIG. 1 depicts a functional block diagram illustrating a data processing system.

Analytical database systems manage very large amounts of data and are optimized for queries that must read large portions of it. One of the most expensive operations in such systems are joins on very large tables. Analytical queries frequently contain joins on tables that do not fit in main memory. These tables are generally unsorted so that the conventional approach to execute such joins is to perform a partitioned disk-based hash-join. However, such approaches are expensive in term of processing resources.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The storage device may comprise a memory and/or disk based storage. The join attribute is an attribute that belongs to the first and second data tables.

The term "disk" as used herein may comprise a hard disk drive (HDD), a direct access storage device (DASD) or a logical unit number (lun) in a storage device. The term "disk" is intended to embrace not only magnetic storage devices, but also optical, solid state and other types of storage devices.

The term "partitioned join" or "partition join" as used herein refers to the combination of records from a first and a second data table that are partitioned on the same column or attribute (e.g., the join attribute) with the same partitioning scheme. The partition join is performed partition by partition (in parallel and/or in sequence), wherein for a given partition range or partition type the partition join is performed by combining a portion of the first data table with another portion of the second data table, wherein the two portions belong to respective partitions having the given partition range or type. For example, the first data table (A) and the second data table (B) may be partitioned into three partitions, such that the first data table may be distributed over the three partitions (to obtain partitions A1, A2 and A3 where A1+A2+A3=A) and the second data table may be distributed over three partitions (to obtain partitions B1, B2 and B3 where B1+B2+B3=B). The partitioned or partition join of A and B would then be a combination of the partition join between A1 and B1, the partition join between A2 and B2 and the partition join between A3 and B3.

The providing of the attribute value information may comprise receiving the attribute value information from a user of the computer system. In another example, the providing of the attribute value information may comprise automatically generating the attribute value information by the computer system, wherein the computer system is configured to perform the above method. The attribute value information may comprise data descriptive of the join attribute. For example, the attribute value information may comprise a maximum and a minimum value of the join attribute in a given table. In another example, the join attribute may comprise a multi-value attribute having or encompassing at least a first sub-attribute and a second sub-attribute (e.g., a date attribute written as Year.Month.Day is a multi-value attribute having "year", "month" and "day" as sub-attributes) wherein the attribute value information may comprise distinct values of the first and second sub-attributes in a given table.

The processing of a pair wise partition join may be performed for at least part of the defined partitions. The at least part of the defined partitions may be user defined or may randomly be selected from the partitions. This may be advantageous for test analyses where the whole data or partitions are not needed in order to perform a test. For example, the processing of a pair wise partition join may be performed on all defined partitions.

The above features may have the advantage of speeding up the partitioned join operations. The present method may have the advantage of performing the partitioning on data blocks (referred to also as blocks) as they are stored on the storage device e.g., disk. The present method may maintain the data blocks where they are stored without reading them and writing them back e.g., on the disk after the partitioning is performed. This is in contrast with the conventional methods that require changing the structure of data stored on disk in order to perform the partitioning. This leads to multiple read and write operations to the disk.

According to one embodiment, the first partition range being immediately followed by a second partition range, the determining of the second data blocks comprising: extracting records of the second data blocks that fall under the second partition range; buffering the extracted records in the memory or in the disk.

The first partition range may cover an interval [v1, v2] of values of the join attribute while the second partition range may cover an interval [v2, v3] of values of the join attribute, wherein v1<v2<v3. In another example, the order of the partition regions may be predefined e.g., user defined. For example, a first partition range may cover entries having a date value indicating year=2009 and month=January, while the second partition range may cover entries having a date value indicating year=2010 and month=January etc.

The buffering may comprise storing the extracted records in a data buffer of the disk or memory, wherein the data buffer may comprise a region of the memory or of disk used to temporarily store extracted records while the partition join operation is still being executed. After using the buffered data, the buffered data may be deleted.

The buffering of records of a subsequent partition range may enable further speeding up the partition join process. For example, instead of reading the whole data block that overlaps two partitions twice (i.e., one time for the partition join that involves the first partition and a second time for the partition join that involves the second partition), the data block is fully read at once and the records that belong to the subsequent partition are separately stored either on disk or memory. In this way, when performing the partition join on the subsequent partition only those records will be read instead of the whole data block.

According to one embodiment, the method further comprises: repeating the determining steps for processing a second pair wise partition join on the respective second partition range with feeding the records comprising reading the buffered records if available instead of reading respective second data blocks comprising the buffered records. This embodiment may have the advantage of further speeding up the partition join process.

According to one embodiment, the defining of the partitions is performed such that: every partition of the partitions includes at least one data block; and/or partition bounds are at the very beginning or very end of a data block of the data blocks, the very beginning and the very end of the data block being defined by a minimum and maximum value of the join attribute in the data block respectively. This embodiment may provide an optimal partitioning method that may reduce the number of data blocks that fall between two or more partition ranges.

According to one embodiment, the defining of the partitions comprises: ordering the data blocks of the first data table in accordance with the minimal value of the join attribute of each data block; assigning to a current partition of the partitions data blocks in the order of their minimal join attribute value until the size of the current partition reaches a predefined maximum memory size, thereby defining a partition range of the current partition by the smallest and the largest join attribute value in the assigned blocks; and repeating the assigning step for another partition of the partitions using non previously assigned data blocks of the first data table until processing of all data tables. This (equi-depth) embodiment may further speed up the partition join process as the partition that is involved in the join operation can be fully loaded in the memory and thus can be read exclusively from the memory. This is in contrast to the case where only part of the partition can be loaded in the memory and the other part may be read from disk.

According to one embodiment, determining of the partition ranges comprises: dividing the range between the smallest and the largest join attribute value of the data blocks into a given number of partitions using the attribute value information; adjusting partition range boundaries to match the nearest beginning or end of a data block of the first data table. This embodiment may provide an efficient method for providing partitions or partition ranges such that the number of data blocks that fall between two or more partition ranges is minimized.

According to one embodiment, each data block of the first data table and/or second data table covers a respective block range defined by the respective minimum and the maximum values of the join attribute in the respective data block; determining of the partition ranges comprises: defining an initial range by the smallest and the largest join attribute value in the first and/or second data table; determining a cutting subrange of the initial range for which the number of data blocks having respective block ranges falling in the cutting subrange is minimized; dividing the initial range into two sub-ranges, wherein the maximum join attribute value of a first sub-range of the two subranges and the minimum join attribute value of a second subrange of the two sub-ranges are within the cutting subrange; if the size supported by a range of the first and the second subranges is larger than a predefined maximum memory size, repeating the step of dividing for that range until the size supported by that range is equal or below the predefined maximum memory size. This embodiment may provide an efficient method for providing partitions or partition ranges such that the number of data blocks that fall between two or more partition ranges is minimized.

According to one embodiment, the dividing being performed such that at least one data block is fully contained in each of the first and second sub-ranges.

According to one embodiment, wherein before the extracting step determining that b<n/k wherein b is the number of the second data blocks, n is the number of data blocks in the first data table and k is the number of partitions (e.g., as described below).

FIG. 1 depicts a functional block diagram illustrating a data processing system or computer system 100 according to an example embodiment of the present invention.

The data processing system 100 comprises a computer system 101. The components of computer system 101 may include, but are not limited to, one or more processors or processing units 103, a storage system 111, a memory unit 105, and a bus 107 that couples various system components including memory unit 105 to processor 103. Storage system 111 may include for example a hard disk drive (HDD). Memory unit 105 may include computer system readable media in the form of volatile memory, such as random access memory (RAM) and/or cache memory.

Computer system 101 typically includes a variety of computer system readable media. Such media may be any available media that is accessible by computer system 101, and it includes both volatile and non-volatile media, removable and non-removable media.

Computer system 101 may also communicate with one or more external devices such as a keyboard, a pointing device, a display 113, etc.; one or more devices that enable a user to interact with data processing system 100; and/or any devices (e.g., network card, modem, etc.) that enable data processing system 100 to communicate with one or more other computing devices. Such communication can occur via I/O interface(s) 119. Still yet, data processing system 100 can communicate with one or more networks such as a local area network (LAN), a general wide area network (WAN), and/or a public network (e.g., the Internet) via network adapter 109. As depicted, network adapter 109 communicates with the other components of data processing system 100 via bus 107.

Memory unit 105 is configured to store applications that are executable on the processor 103. For example, the memory unit 105 may comprise an operating system as well as application programs. The application programs comprise a partitioning application 108. The partitioning application 108 may have access data blocks 127A-N and 128A-N stored in a data source system 123. In embodiments, N is representative of any number of blocks (i.e., N may be 100, 1000, 10000, or an infinite number of data blocks). The data blocks 127A-N may be blocks of a first data table A and data blocks 128A-N may be blocks of a second data table. For simplicity of the description only two set of data blocks 127 and 128 are shown; however, the present method may be performed for more than two sets of data blocks. In an embodiment, the present method may be performed for any number of sets of data blocks.

The data source system 123 may provide and store data blocks 127 and 128. The data source system 123 is connected to the computer system 101 via one or more networks for example, the Internet, a local area network, a wide area network and/or a wireless network. In addition or alternatively the data blocks 127 and 128 may be stored on the storage system 111.

Data source system 123 may support for example different storage models or techniques such as relational, columnar, graph, etc. that are representative for persistent repositories used to store data.

For example, each of data blocks 127 and 128 may comprise one or more columns, wherein at least one column is common or is present in each of data blocks 127-128. Each column of the data blocks may be represented, identified or defined by a respective attribute. The term "column" is used interchangeably with the term "attribute".

For example, data blocks 127A-N (128A-N) may contain an equal or unequal number of rows of the first data table (second data table). The data blocks 127A-N (128A-N) may have no common rows of the first data table (second data table). The data blocks 127A-N (128A-N) may be separated from each other based on values of a join attribute of the attributes of the first data table (second data table). The join attribute is present in data blocks 127A-N and 128A-N.

For example, in case the join attribute comprises a single attribute value, each data block of the data blocks 127A-N may cover a respective range of values of the join attribute. For example, data block 127A may comprise data for users having an age between 20 and 50 years, while data block 127B may comprise data for users having an age between 60 and 70 years etc. Each data block of the data blocks 128A-N may cover a respective range of values of the join attribute.

In another example, the join attribute may comprise a multi-value attribute. The multi-value attribute may have or encompass at least a first sub-attribute and a second sub-attribute. The multi-value attribute may comprise, for example, International Mobile Subscriber Identity IMSI for user equipment. The IMSI may hold multiple information. For example, the IMSI may indicate the country, the city and the operator that support a given user equipment (e.g., the "country", "city" and "operator" may be sub-attributes of the attribute IMSI). Using these multiple information obtained from the IMSI attribute, the data blocks 127-128 may be separated from each other. For example, a data block 127A may comprise entries for user equipment supported by a given Operator e.g., O2 in a given country e.g., Germany, while data block 127B may comprise entries for user equipment of O2 in France. In this case, a user willing to count the number of O2 users in Germany does not have to scan the whole data table 127, rather the user can scan data block 127A only.

The data processing 100 may further comprise attribute value information 137 on the join attribute for data blocks 127A-N and/or 128A-N. The attribute value information 137 may be stored in the data source system 123, storage system 111 and/or memory unit 105.

The operation of the data processing system 100 will be described in details with reference to FIGS. 2-6.

Figure 2:
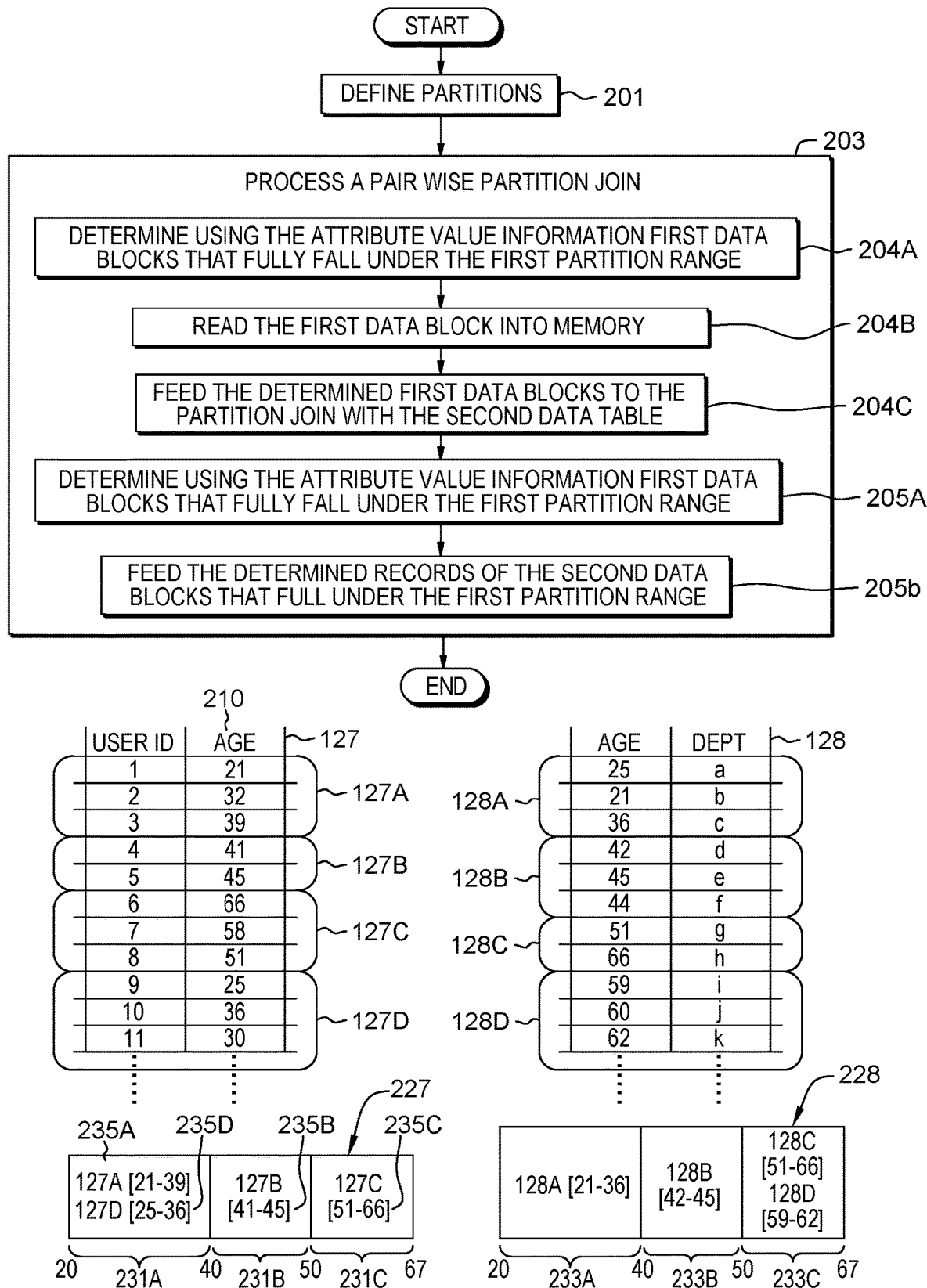
FIG. 2 is a flowchart of a method for performing a partitioned join on two data tables.

FIG. 2 is a flowchart of a method for performing a partitioned join on a first data table 127 (e.g., having data blocks 127A-D) and a second data table 128 (e.g., having data blocks 128A-D) on a join attribute 210 ("age") of the first data table 127 and the second data table 128. The second data table 128 further comprises an attribute "dept" indicating the department to which a user is assigned. For simplicity of the description FIG. 2 shows a simplified table structure of the first 127 and second 128 data table.

In step 201, partitioning application 108 may define partitions 227 and 228 for the first data table 127 and the second data table 128 using at least the attribute value information 137 on the join attribute 210. The partitions 227 (228) may be defined using the attribute value information 137 on the join attribute 210 in the data blocks 127A-D and/or 128A-D. The partitions 227 (228) may be logical partitions. Each partition of the partitions 227 may have a respective partition range 231 of values of the join attribute 210. Each data block of the data blocks 127A-D and 128A-D has an associated block-range 235A-D of values of the join attribute 210. Each partition of the defined partitions may indicate or comprise data blocks whose block-ranges 235A-D overlap partially or completely with the partition range 231.

For example, a partition range may comprise the age interval [20, 40] (20 years to 40 years), while a block range that belongs or indicated by that partition range may comprise an age interval [21 39] of data block 127A and [25 36] of data block 127D. For simplicity of the description only data blocks that are fully contained in partitions are shown.

In another example, the join attribute may comprise user's birth date encoded in a format like Year.Month.Day.Hour. In this case, at least one value of the sub-attributes Year, Month, Day and Hour may be used to define the partitions. For example, a partition range may cover or be defined by a pair of values of the sub-attributes e.g., (2009, September), or using another granularity such that the partition range may be defined by the pair (2009, summer=4 months). In this case, data of all users that have birth date comprising the year 2009 and one of the 4 summer months may belong to the same partition.

The partitions 227 may be defined at once for the first data table 127. And the same partitions 228 may be used or applied to the second data table 128. This may be advantageous in case of equi-join operations involving partitions of the first and second data tables.

In step 203, the partitioning application 108 may process a pair wise partition join on a respective first partition range of the determined partition ranges 231.

For that, the partitioning application 108 may determine in step 204A using the attribute value information first data blocks (127A, 127D) of the first data table 127A-N that fully fall under the first partition range 231A. The partitioning application 108 may read in step 204B the first data blocks (127A, 127D) from where they are stored e.g., storage system 111 into a memory and may feed in step 204C the determined first data blocks to the partition join on the first partition range 231A with the second data table 128A-N. The partition join may thus be performed between partitions 231A and 233A.

Figure 6A:
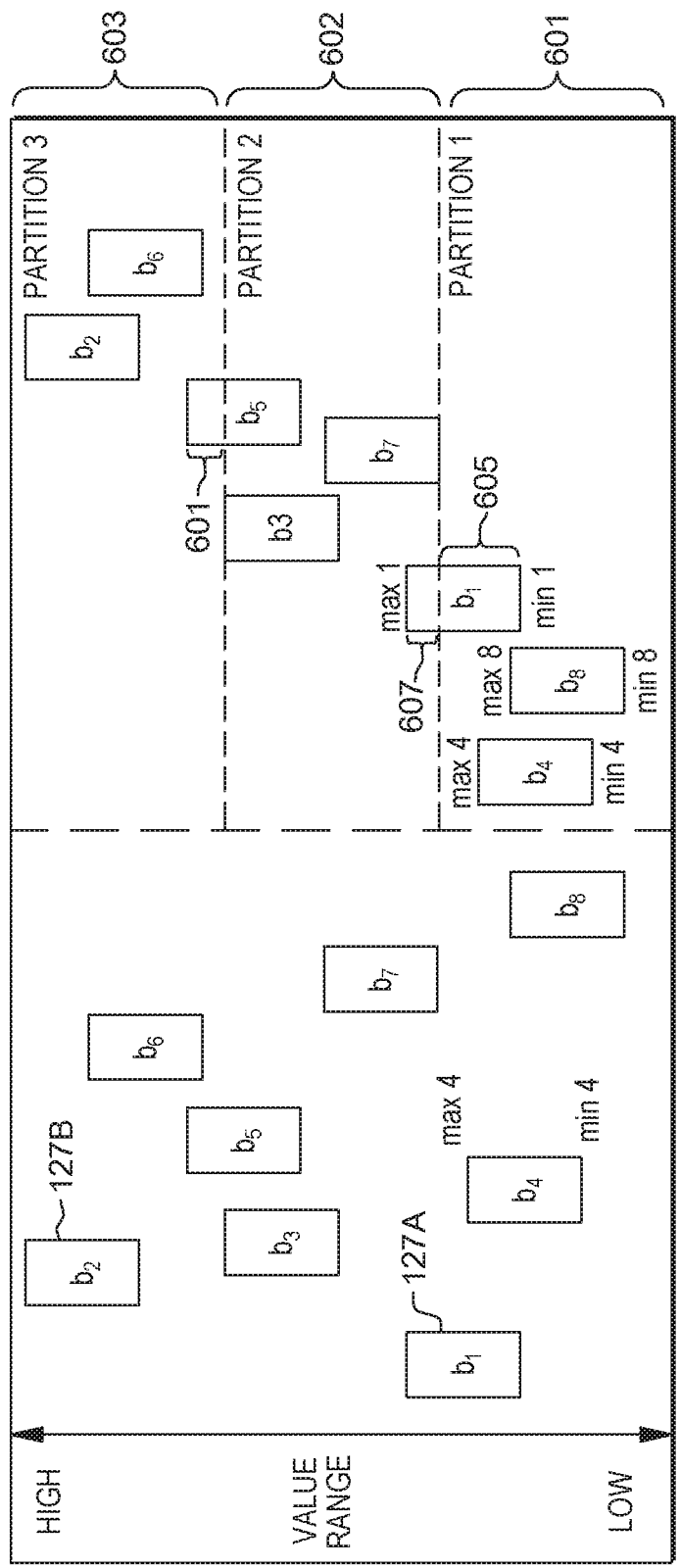
FIG. 6A-C illustrate a simplified example for partitions definition.
Figure 6B:
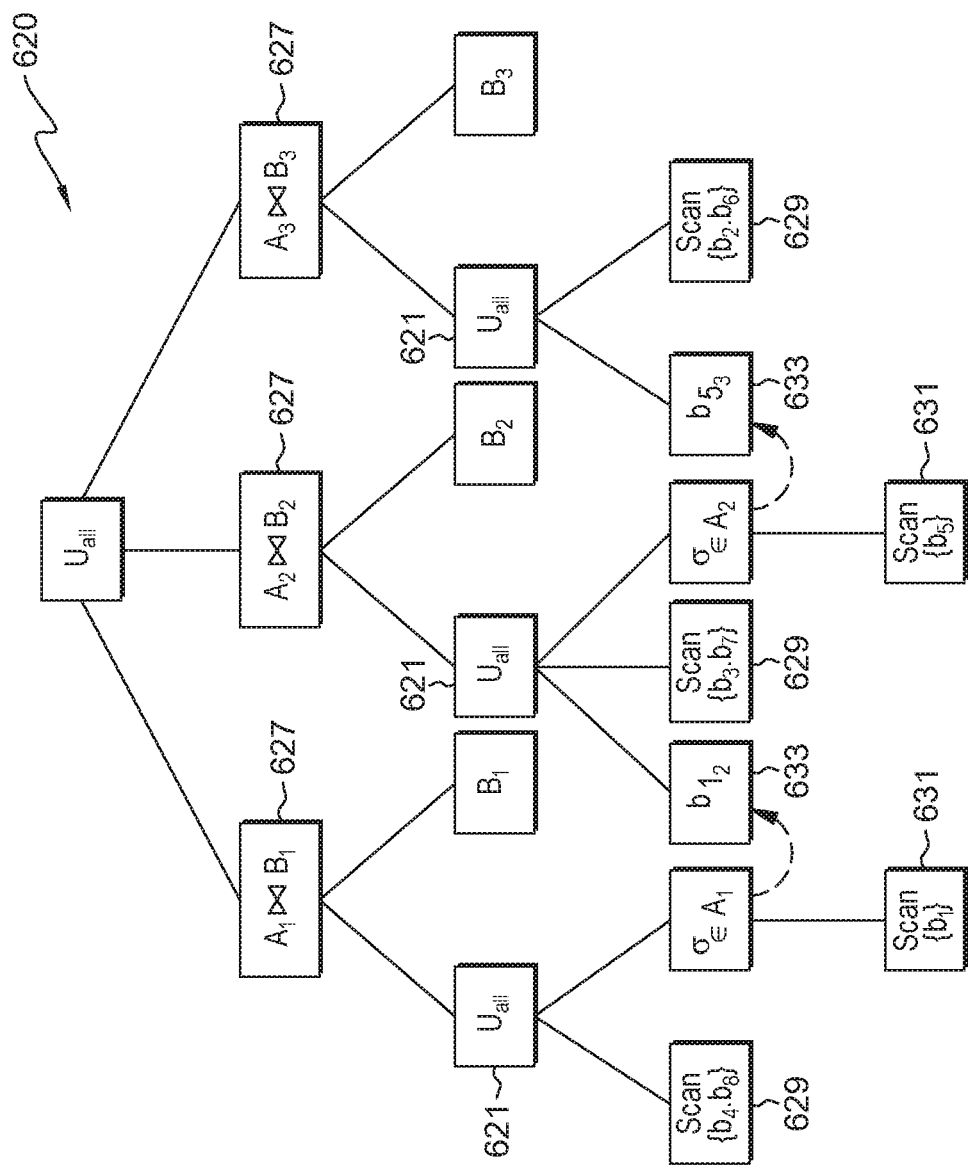
Figure 6C:
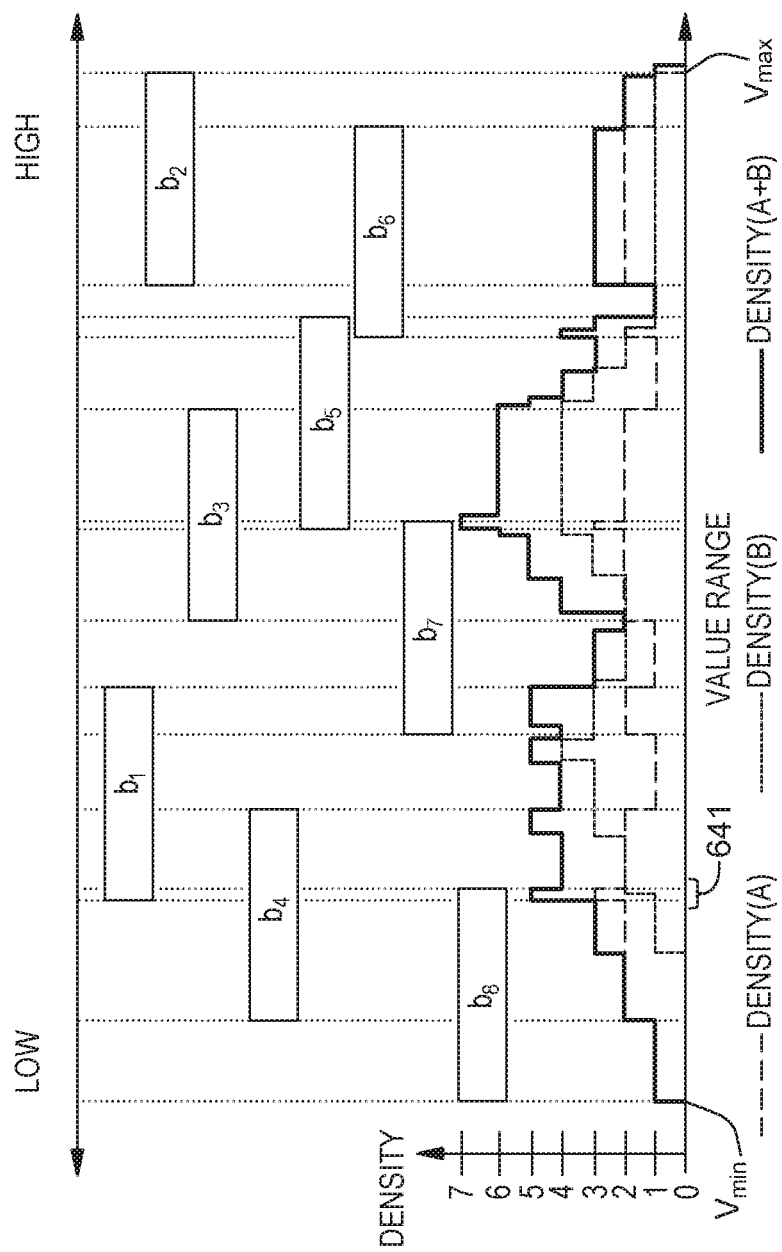

In step 205A, the partitioning application 108 may determine using the attribute value information second data blocks of the first data table that partly fall under the first partition range and may selectively feed in step 205B records of the second data blocks that fall under the first partition range to the processing of the first partition range with the second data table. FIG. 6A-C shows further examples of partially falling data blocks (or overlapping data blocks) i.e., data blocks whose ranges overlap with more than one partition.

In one embodiment, step 203 may be repeated for each partition of the defined partitions, such that the pair wise partition join may be performed between pairs (231A, 233A), (231B,233B) and (231C,233C).

Figure 3:
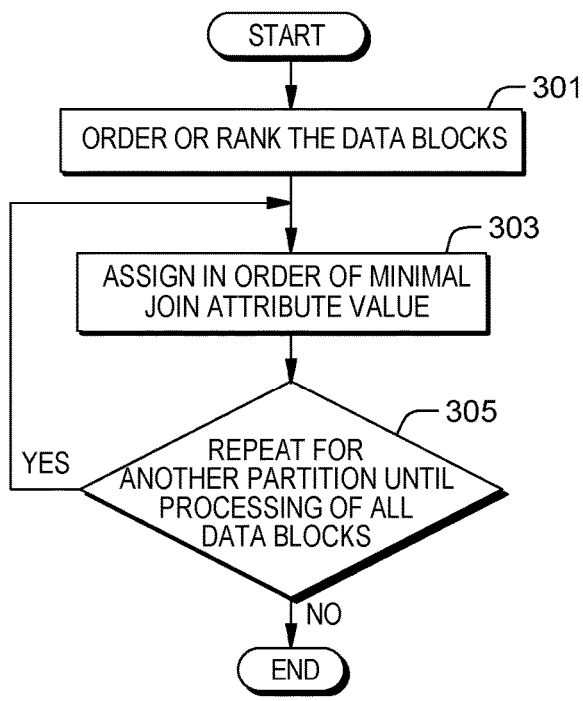
FIG. 3 is a flowchart of an exemplary method for defining partitions.

FIG. 3 is a flowchart of an exemplary method for defining the partitions of step 201. The present method may provide a progressive partitioning, partition by partition i.e., as soon as a partition is defined a next partition is defined and so on until all data blocks 127A-N are assigned to partitions. For example, partition 231A may be first defined by identifying data blocks 127A and 127D.

In step 301, the partitioning application 108 may order or rank the data blocks 127A-N of the first data table in accordance with the minimal value of the join attribute of each data block. For example, if data block 127A has a minimum value of the join attribute minA and data block 127B has a minimum value of the join attribute minB, the data blocks 127A and 127B may be ordered in accordance with minA and minB such that if minA>minB, the data block 127B may be first ranked followed by the data block 127A.

In step 303, the partitioning application 108 may assign to a current partition (e.g., the first or second partition being defined etc.) of the partitions data blocks in the order of their minimal join attribute value until the size of the current partition reaches (equal or smaller than) a predefined maximum memory size, thereby defining a partition range of the current partition by the smallest and the largest join attribute value in the assigned blocks.

Following the above example, data block 127B may be first assigned to a first partition and then the size of the data block 127B is compared with the predefined maximum memory size. If the size of the data block 127B is smaller than the predefined maximum memory size, the data block 127A is further assigned to the first partition if the size of both data blocks 127A and 127B is smaller than the predefined maximum memory size.

The assigning step 303 may be repeated for another partition (decision step 305) of the partitions using non previously assigned data blocks of the first data table until processing of all data blocks. The resulting partition ranges may be applied for the second data table i.e., data blocks 128A-N.

The method described with reference to FIG. 3 may similarly be applied for the data blocks 128A-N, and then the resulting partition ranges may be applied for the first data table i.e., 127A-N. This is particularly important in case of an equi-join operation.

Figure 4:
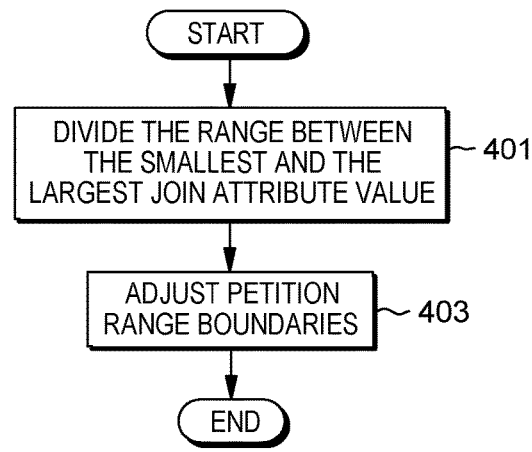
FIG. 4 is a flowchart of another exemplary method for defining partitions.

FIG. 4 is a flowchart of another exemplary method for defining the partitions of step 201.

In step 401, the partitioning application 108 may divide the range between the smallest and the largest join attribute value of the data blocks 127A-N into a given number of partitions using the attribute value information. The given number may for example be user defined or automatically defined using a predefined list of numbers and by randomly choosing a number of the predefined list.

For example, the smallest and the largest join attribute value of the data blocks 127A-N may be equal to minD and maxN respectively. minD may be the minimum value of the join attribute in data block 127D while maxN may be the maximum value of the join attribute in data block 127N.

The range may be divided into two sub-ranges [minD v1] and [v1 maxN], where v1 is a value of the join attribute that is smaller than maxN and higher than minD.

After dividing the range, the partitioning application 108 may adjust in step 403 partition range boundaries to match the nearest beginning or end of a data block of the first data table 127A-N. Following the above example, the value v1 may be compared with the minimum values of the join attribute in respective data blocks 127A-C and 127E-M and may also be compared with the maximum values of the join attribute in respective data blocks 127A-C and 127E-M, and may define the smallest difference |v1−minX| or |v1−maxX| (where X=A−C, E−M). If for example, the difference |v1−minF| is the smallest one, the partition ranges become [minD minF] and [minF maxN]. If, in another example, |v1−maxX| is the smallest one, the partition ranges become [minD maxB] and [maxB maxN].

Figure 5:
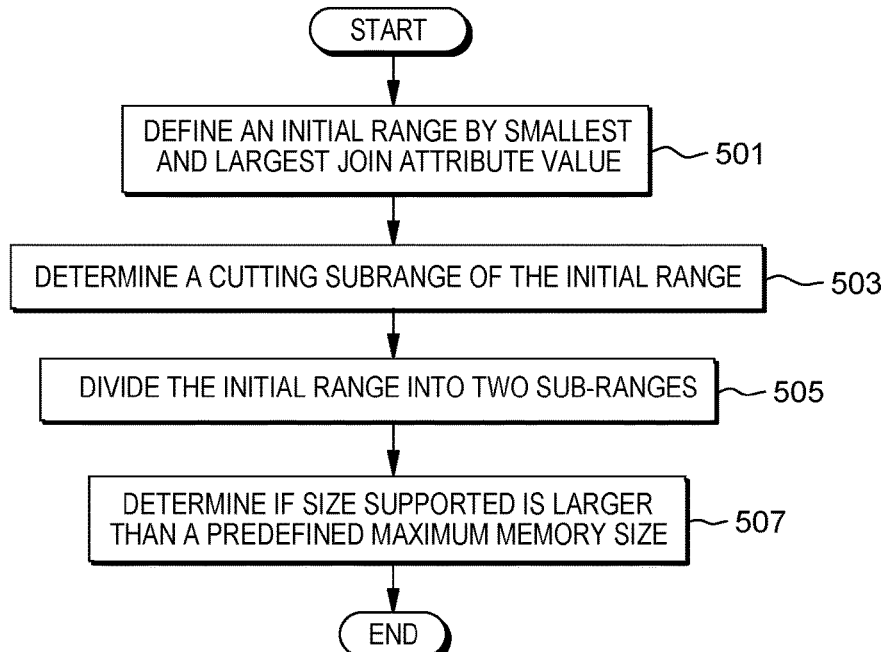
FIG. 5 is a flowchart of further exemplary method for defining partitions.

FIG. 5 is a flowchart of another exemplary method for defining the partitions of step 201. For example, each data block of the first data table 127A-N and/or second data table 127A-N covers a respective block range defined by the respective minimum and the maximum values of the join attribute in the respective data block. For example, data block 127X may have a block range [minX maxX], where minX is the minimum value of the join attribute in data block 127X and maxX is the maximum value of the join attribute in data block 127X. In an example, X is representative of any of the data blocks (i.e., 127A, 127B, 127C, etc., as shown in FIG. 2).

In step 501, the partitioning application 108 may define an initial range by the smallest and the largest join attribute value in the first and/or second data table. For example, when considering the first data table only the smallest and the largest join attribute value of the data blocks 127A-N may be equal to minD and maxN respectively as described above.

In step 503, the partitioning application 108 may determine a cutting subrange of the initial range for which the number of data blocks having respective block ranges falling in the cutting subrange is minimized. For example, when considering the first data table, each block range [minX, maxX] may be compared with a first cutting subrange and may be checked whether the block range [minX, maxX] overlaps with the cutting subrange. If the block range [minX, maxX] overlaps with the first cutting subrange a predefined first count may be incremented e.g., by 1. The same comparison may be repeated for a second cutting subrange. This may result in a set of counts that are associated with respective set of cutting subranges. The cutting range of the set of cutting ranges having the smallest count may be selected. The selected cutting subrange may be the determined cutting subrange of step 503. For example, the set of cutting subranges may be obtained by dividing the initial range into equally sized set of cutting subranges. In another example, the set of cutting subranges may be obtained by randomly dividing the initial range into the set of cutting subranges.

In step 505, the partitioning application 108 may divide the initial range into two sub-ranges, wherein the maximum join attribute value of a first sub-range of the two subranges and the minimum join attribute value of a second subrange of the two subranges are within the cutting subrange. The maximum join attribute value of the first sub-range is the maximum value of the join attribute in data blocks covered or indicated by the first sub-range. The minimum join attribute value of the second sub-range is the minimum value of the join attribute in data blocks covered or indicated by the second sub-range.

In step 507, the partitioning application 108 may determine if the size supported by a given range of the first and the second subranges is larger than a predefined maximum memory size, and if so the step 505 may be repeated for that given range until the size supported by that given range is equal or below the predefined maximum memory size.

FIG. 6A illustrates a simplified example for partitions definition. The example in FIG. 6A shows eight data blocks b1-b8 of one data table (e.g., 127) that may need partitioning. The assumption is that four data blocks may fit into the memory unit 105. In this example, the data table 127 may fit (or may be comprised) in three partitions partition 1 601, partition 2 602 and partition 3 603. Block ranges [min4 max4] and [min8 max8] of data blocks b4 and b8 overlap exclusively with the range of partition 1 601 minx and maxx are the minimum and the maximum values of the join attribute 210 of the data tables 127 and 128 in data block x of the data table 127. Only partitions of data table 127 are shown; however, the same partition ranges 601-603 are used to define partitions for data table 128.

Thus, when the first partitions are joined such as partition 1 601 of data table 127 and corresponding partition (i.e., having the same partition range 601) of data table 128, b4 and b8 may be directly read from disk e.g., 111 or buffer pool and processed in the partition join. b1 overlaps with partition 1 601 and partition 2 602. Thus b1 may be read for the partition join involving partition 1 and filtered for rows 605 that fall into partition 1 601. The remaining rows 607 which fall into partition 2 602, can be buffered in main memory or, in case main memory is scarce, on disk. Alternatively, these rows 607 may be ignored and b1 is read again for the partition join of the second partitions (e.g., partition 2 602 and corresponding partition of data table 128).

Similarly, to join the second and third partitions, blocks b3 and b7, or b2 and b6, respectively, may directly be fed to the partition join. Thus, at worst a fraction of the rows of b1 607 and b5 609 may be buffered on disk and in the best case no disk I/O is required at all for joining the partitions.

The partitioning may be orthogonal to the join approach that is used for the pairwise joins. The partitioning may ensure that each pairwise join can be executed in main memory, and a different join algorithm could be used for every pair of partitions.

Thus, in contrast to conventional partitioning method, the present method may not entirely scan the input tables e.g., 127 at once, as they do not fit into main memory. For every pairwise partition join, those data blocks are read that fall entirely into a current partition. Their rows are directly fed to the join. In addition, those data blocks that overlap with both the current partition and others are scanned as well, but followed by a selection that separates the partitions. Only the rows for the current partition are joined. The other rows are either buffered for the next pairwise partition join or ignored. Finally, the join may also include the rows that were buffered from overlapping data blocks in earlier partitions.

Data blocks which overlap more than one range partition, such as b1 and b5 in FIG. 6A, can be processed in different ways. The fewer such blocks, the better.

Different approaches to address the overlapping data blocks are described below. A query compiler (e.g., of the partitioning application 108) may select an approach of the different approaches for each partition boundary. For example, for rows or entries 607 a given approach of the different approaches may be used while for entries 609 a same or another approach of the different approaches may be used.

Multiple Reads

One way to process such overlapping blocks is to scan them multiple times; once with the processing of every partition they overlap. Every time, a different restriction may be applied, so that only the rows of the current partition are returned. The multiple reads approach does not require disk writes, nor does it require memory buffers. So multiple reads may be favorable when writes are particularly expensive, or when memory is low.

Memory Buffering

If the partitions are sufficiently smaller than the available memory and only a few blocks contain rows from other partitions, it may be possible to buffer those rows in main memory e.g., 105. In terms of disk I/O and CPU cost, memory buffering may be ideal, as the blocks are read from disk only once. Also, base predicates and other filters are executed exactly once. The rows for the current partition are extracted and do not bloat the buffer. If a data block overlaps more than two partitions, the rows can be distributed to different buffers, one for each partition. This way, further filtering is not required. Thus, memory buffering may yield the lowest total amount of processing.

Disk Buffering

If not enough main memory is available for memory buffering, the rows that satisfy base table predicates but that do not fall into a current partition, can still be written to disk. While this does introduce disk I/O it requires fewer reads than the multiple reads approach, as not all rows of the data block are buffered to disk. As the rows are filtered only once, the CPU cost may be lower as well. Disk buffering may be used as a fallback strategy for memory buffering. Thus, memory buffering is attempted and when memory runs out, the memory buffers are written to disk.

To execute a partition join that involves overlapping data blocks, a query compiler (e.g., partitioning application 108 may comprise the query compiler) may create an execution plan 620 as shown in FIG. 6B that contains many scans 629 with different scan lists. Also, the plan may include selections, buffers and "union all" operators 621. FIG. 6B shows such an execution plan for a partitioned join of tables A (e.g. 127) and B (e.g., 128). While B is not shown in detail, the partitions partition 1 (referred to as A1), partition 2 (referred to as A2) and partition 3 (referred to as A3) and data blocks for table A that correspond to those depicted in FIG. 6A are shown. As can be seen, the present method may only require to read the input tables once, provided that the rows from overlapping data blocks may be buffered in main memory e.g., 105.

The attribute value information 137 is available at query compile time without run-time information. That is, the query compiler may easily create such an execution plan. To do so, the query compiler may first filter the data blocks of both input tables A and B. The query compiler may eliminate data blocks that are not required in the query at all, because they cannot contain matches for basic predicates on the tables. The remaining blocks are assigned to one or more range partitions A1-A3. The blocks of every partition are again divided into those that fall exclusively into the partition and those that overlap with others as well. For example, for partition A1 a scan list comprises b1, b4 and b8, where b1 is indicated as being an overlapping data block that may require a different scanning method as described above.

Based on the resulting scan lists, an execution plan is built as shown in FIG. 6B. For example, the pair of partitions that may be joined are defined such that a partition join instruction may be defined so as to execute in 627 either in parallel or consecutively the partition joins A1-B1, A2-B2 and A3-B3. For each partition join e.g., involving A1 and B1 or A2 and B2 a UNION ALL may be executed in order to combine data blocks e.g., of A1 or B1 before performing the partition join 627. For that, the scan list may be used to identify the data blocks that may be fully scanned 629 without requiring any buffering and those data blocks that require scanning and buffering 631 as they are overlapping data blocks. The scan list may also indicate the buffered rows or entries 633 such that may also be scanned entirely (without buffering). This is for example shown for partition join involving A2 and B2.

To avoid partition bounds in places with many overlapping data blocks, an alternative partitioning (as described with reference to FIG. 6C) approach that makes use of density functions may be used. For this, the density functions of both joined tables (127 and 128) are computed, i.e., the number of overlapping data blocks at any point in the value range. It is desirable to have partition bounds in places with low density i.e., with little overlap. The density function can be computed with O(n log n) effort by iterating through the minimal and maximal values of the join attribute 210 of all data blocks in ascending order and increasing the density for every min value and decreasing it for every max value that is encountered.

The density function provides the number of data blocks whose block ranges overlaps with a given range. For example, for the range 641 three data blocks (b1, b4 and b8) are found to have block ranges overlapping with the range 641. The density function provides a value 3 over range 641.

FIG. 6C illustrates the density function for the depicted data blocks of table A (from FIG. 6A) as well as the assumed density for table B. The sum of the two density functions can be computed in the same way by recognizing the data blocks of both tables. The sum denotes the total number of blocks that overlap more than one partition for any possible partition boundary, which is a number to be minimized.

In order to obtain an optimal range partitions, recursive low density splitting computes the sum of the density functions. Initially, the entire value range [vmin; vmax] is considered. Within the currently considered range [vmin; vmax], the minimal value v of the density function is determined, such that at least one full data block is fully below and one block is fully above v (naturally, this block may also be fully included in the current range). The current range [vmin; vmax] is split into two sub-ranges [vmin; v] and (v; vmax ]. As soon as a sub-range fits into memory (i.e., the size of data blocks that belong to the sub-range is smaller or equal than the determined maximum memory size), it is considered a range partition and not further subdivided. Otherwise, the sub-range is divided again as described above to determine its minimal density v, and so on.

As can be seen in FIG. 6C, the density functions consist of horizontal sections (e.g., a value for a given range). This means, that the minimum v is actually a range [v1; v2]. We consider both v1 and v2 as candidates for v, as they mark the beginning or the end of a data block. If only either v1 or v2 causes one of the two resulting sub-ranges to fit in memory, it is selected as v. Otherwise, it is undefined whether v1 or v2 is used.

In one example, every time a sub-range is further divided, the resulting range partitioning costs (as described below) are compared to the costs of a hash-partitioning method. The recursion into the sub-range is only performed if range partitioning costs are still enough for performing the recursion as described above.

As recursive low density splitting may create very small partitions, all adjacent partitions are merged with their neighbors in a final step as long as memory suffices.

The embodiment of FIG. 6C may be combined with the equi-depth embodiment described above such that data blocks are added to a currently considered range in ascending order as long as they fit into memory. At this, the sum of the density functions of both tables is computed for the current range as described with reference to FIG. 6C. Let vmin and vmax denote the beginning and end of the current range. The minimal density v ∈[vmin, vmax] is determined such that at least one data block is completely contained within [vmin, v]. The range [vmin, v] is kept as a range partition. If the previous range partition plus the new range partition fit in memory together, the previous range partition is increased up to v. Subsequently, (v, vmax] is the currently considered range, further data blocks are added in ascending order, and the process repeats.

Partitioning Costs

The state-of-the-art hash-partitioning may require n−n/k disk reads and n-n/k disk writes, if n is the number of data blocks from both tables A and B and k the number of partitions. In addition, the hash value of every row must be computed. This assumes that a single partitioning pass creates sufficiently small partitions—if not, then hash-partitioning costs are higher. In the best case, i.e. if all data blocks fall into exactly one range partition, the present method may create no run-time costs (ignoring the costs at query compile time to compute the scan lists and execution plan). However, every block that overlaps several partition ranges requires to compute a restriction for each row and, in the worst case, may require the majority of these rows to be written to and read from disk.

For simplicity, assuming that computing the hash value and executing the range restriction for each row comes at comparable costs. Also, assuming that disk buffering is required in all cases and that all records of a block do not fall into the range partition for which the block is initially scanned. Then, the present method may require b disk reads and b disk writes if b is the number of data blocks that overlap more than one range partition. Thus, present method may be advantageous if b<n/k, i.e. if fewer blocks overlap several range partitions than would fit into one hash partition.

Using this metric, it can be decided while the partitions are being defined whether the present method of partitioning is still favorable both for the entire table range and for sub-ranges.

Following are simplified use cases of the present partitioning method.

Join Flipping

The present partitioning method may be orthogonal to the algorithm employed to join the partition pairs e.g., independent of the algorithm. Also, as long as they produce semantically equivalent results, different join algorithms can be used for different partition pairs. The range partitions on both tables cannot always be expected to have equal cardinalities, so that sometimes card(Ai)>card(Bi) and sometimes card(Ai)<card(Bi).

If the query compiler determines that the cardinalities of the partitions are very unbalanced, it may flip the sides of the join. For symmetric join types (i.e. inner join or full outer join). For left or right semi-joins, anti-joins, or outer joins, the join semantics need to be swapped to a right or left one, respectively.

Sorting

Typically, query optimizers tend to use a sort-merge join for queries that require a sort on (a prefix of) the join columns later on, such as the following: SELECT * FROM a JOIN b ON a.x=b.x ORDER BY a.x A sort-merge join must sort both joined tables completely. The joins that are addressed by the present method may involve tables that do not fit into main memory. Thus, sorting these tables must be done externally, i.e., by writing sorted runs to disk. However, this may be expensive in term of processing resources.

If the join is very selective, i.e. a large fraction of rows is discarded in the join, then lots of rows were sorted in vain. The present method may not only be capable of accelerating the join by partitioning effort (both disk I/O and CPU cost), as a range partitioning is performed on the rows, the rows come out "presorted". Thus, in higher partitions only larger values can occur.

This can be exploited by sorting the output of each partition join, which can be done in main memory. Due to the range partitioning scheme, the sorted results of each partition can be simply appended to achieve a fully sorted result.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for performing a partitioned join, the method comprising:
   determining, by one or more computer processors, a first data table and a second data table to be joined, wherein the first data table and the second data table have a join attribute, and wherein data blocks of the first data table are stored on a storage device;
   determining, by one or more computer processors, an attribute value information of the join attribute for the data blocks of the first data table;
   defining, by one or more computer processors, at least one partition for the first data table and the second data table using at least the attribute value information on the join attribute, wherein each partition of the at least one partition has a respective partition range of values of the join attribute; and
   processing, by one or more computer processors, a pair wise partition join on a first partition range of the determined partition ranges, wherein each data block of the data blocks of the first data table or second data table covers a block range defined by a minimum value and a maximum value of the join attribute associated with the data block and wherein determining of the partition ranges comprising:
      determining, by one or more computer processors, an initial range using a smallest join attribute and a largest join attribute value in the first or second data table;
      determining, by one or more computer processors, a cutting subrange of the initial range for which a number of data blocks having respective block ranges falling in the cutting subrange is minimized;
      dividing, by one or more computer processors, the initial range into two subranges, wherein a maximum join attribute value of a first subrange of the two subranges and a minimum join attribute value of a second subrange of the two subranges are within the cutting subrange; and
      responsive to determining a size supported by a range of the first subrange and the second subrange is larger than a predefined maximum memory size, repeating, by one or more computer processors, the step of dividing the range until a size supported by that range is equal or below the predefined maximum memory size.

2. The method of claim 1, further comprising:
   determining, by one or more computer processors, a second partition range immediately following the first partition range;
   extracting, by one or more computer processors, at least one record of the second data blocks that fall under the second partition range; and
   buffering, by one or more computer processors, the extracted at least one record to the memory.

3. The method of claim 1, wherein each partition of the at least one partition include at least one data block.

4. The method of claim 3, wherein each partition of the at least one partition include partition bounds at a beginning or an end of a data block of the data blocks, wherein the beginning of the data block is a minimum value of the join attribute of the data block and the end of the data block is a maximum value of the join attribute of the data block.

5. The method of claim 1, wherein defining at least one partition for the first data table and the second data table comprises:
   ordering, by one or more computer processors, each data block of the first data blocks in accordance with a minimal value of the join attribute of each data block;
   assigning, by one or more computer processors, each data block of the first data blocks to a partition of at least one partitions in the order of the minimal value of the join attribute until a size of the partition reaches a predefined maximum memory size, and
   repeating the assigning step for another partition of the one or more partitions using data blocks of the first data table not yet assigned until all data blocks are assigned.

6. The method of claim 1, wherein a partition range of each partition of the at least one partitions is determined by dividing a range between a smallest join attribute value and a largest join attribute value of the data blocks into a given number of partitions using the attribute value information and adjusting partition range boundaries to match a nearest beginning or a nearest end of a data block of the data blocks of the first data table.

7. The method of claim 1, wherein the dividing is performed such that at least one data block is fully contained in each of the first sub-range and the second sub-range.

8. A computer program product for performing a partitioned join, the computer program product comprising:
   one or more computer readable storage media; and
   program instructions stored on the one or more computer readable storage media, the program instructions comprising:
      program instructions to determine a first data table and a second data table to be joined, wherein the first data table and the second data table have a join attribute, and wherein data blocks of the first data table are stored on a storage device;

program instructions to determine an attribute value information of the join attribute for the data blocks of the first data table;

program instructions to define at least one partition for the first data table and the second data table using at least the attribute value information on the join attribute, wherein each partition of the at least one partition has a respective partition range of values of the join attribute; and program instructions to process a pair wise partition join on a first partition range of the determined partition ranges, wherein each data block of the data blocks of the first data table or second data table covers a block range defined by a minimum value and a maximum value of the join attribute associated with the data block and wherein determining of the partition ranges comprising:

program instructions to determine an initial range using a smallest join attribute and a largest join attribute value in the first or second data table;

program instructions to determine a cutting subrange of the initial range for which a number of data blocks having respective block ranges falling in the cutting subrange is minimized;

program instructions to divide the initial range into two subranges, wherein a maximum join attribute value of a first subrange of the two subranges and a minimum join attribute value of a second subrange of the two subranges are within the cutting subrange; and responsive to determining a size supported by a range of the first subrange and the second subrange is larger than a predefined maximum memory size, program instruction to repeat the program instruction to divide the range until a size supported by that range is equal or below the predefined maximum memory size.

9. The computer program product of claim 8, further comprising program instructions, stored on the one or more computer readable storage media, to:

determine a second partition range immediately following the first partition range;

extract at least one record of the second data blocks that fall under the second partition range; and buffer the extracted at least one record to the memory.

10. The computer program product of claim 8, wherein each partition of the at least one partition include at least one data block.

11. The computer program product of claim 10, wherein each partition of the at least one partition include partition bounds at a beginning or an end of a data block of the data blocks, wherein the beginning of the data block is a minimum value of the join attribute of the data block and the end of the data block is a maximum value of the join attribute of the data block.

12. The computer program product of claim 8, wherein program instructions to define at least one partition for the first data table and the second data table comprise:

program instructions to order each data block of the first data blocks in accordance with a minimal value of the join attribute of each data block;

program instructions to assign each data block of the first data blocks to a partition of at least one partitions in the order of the minimal value of the join attribute until a size of the partition reaches a predefined maximum memory size, and program instructions to repeat the assigning program instructions for another partition of the one or more partitions using data blocks of the first data table not yet assigned until all data blocks are assigned.

13. The computer program product of claim 8, wherein a partition range of each partition of the at least one partitions is determined by dividing a range between a smallest join attribute value and a largest join attribute value of the data blocks into a given number of partitions using the attribute value information and adjusting partition range boundaries to match a nearest beginning or a nearest end of a data block of the data blocks of the first data table.

14. The computer program product of claim 8, wherein the dividing is performed such that at least one data block is fully contained in each of the first sub-range and the second sub-range.

15. A computer system for performing a partitioned join, the computer system comprising:

one or more computer processors;

one or more computer readable storage media; and program instructions stored on the one or more computer readable storage media for execution by at least one of the one or more computer processors, the program instructions comprising:

program instructions to determine a first data table and a second data table to be joined, wherein the first data table and the second data table have a join attribute, and wherein data blocks of the first data table are stored on a storage device;

program instructions to determine an attribute value information of the join attribute for the data blocks of the first data table;

program instructions to define at least one partition for the first data table and the second data table using at least the attribute value information on the join attribute, wherein each partition of the at least one partition has a respective partition range of values of the join attribute; and program instructions to process a pair wise partition join on a first partition range of the determined partition ranges, wherein each data block of the data blocks of the first data table or second data table covers a block range defined by a minimum value and a maximum value of the join attribute associated with the data block and wherein determining of the partition ranges comprising:

program instructions to determine an initial range using a smallest join attribute and a largest join attribute value in the first or second data table;

program instructions to determine a cutting subrange of the initial range for which a number of data blocks having respective block ranges falling in the cutting subrange is minimized;

program instructions to divide the initial range into two subranges, wherein a maximum join attribute value of a first subrange of the two subranges and a minimum join attribute value of a second subrange of the two subranges are within the cutting subrange; and responsive to determining a size supported by a range of the first subrange and the second subrange is larger than a predefined maximum memory size, program instruction to repeat the program instruction to divide the range until a size supported by that range is equal or below the predefined maximum memory size.

16. The computer system of claim 15, further comprising program instructions, stored on the one or more computer readable storage media for execution by at least one of the one or more computer processors, to:
   determine a second partition range immediately following the first partition range;
   extract at least one record of the second data blocks that fall under the second partition range; and
   buffer the extracted at least one record to the memory.

17. The computer system of claim 15, wherein each partition of the at least one partition include at least one data block.

18. The computer system of claim 17, wherein each partition of the at least one partition include partition bounds at a beginning or an end of a data block of the data blocks, wherein the beginning of the data block is a minimum value of the join attribute of the data block and the end of the data block is a maximum value of the join attribute of the data block.

19. The computer system of claim 15, wherein the dividing is performed such that at least one data block is fully contained in each of the first sub-range and the second sub-range.

* * * * *